United States Patent [19]
Rother et al.

[11] Patent Number: 5,456,185
[45] Date of Patent: Oct. 10, 1995

[54] HINGE CONNECTION FOR CONNECTING VEHICLE PARTS OF A MULTIPLE-UNIT RAIL-BORNE VEHICLE IN AN ARTICULATED MANNER

[75] Inventors: Hans-Jürgen Rother, Salzgitter; Christian Claus, Braunschweig; Karl H. Stache, Salzgitter, all of Germany

[73] Assignee: Linke-Hofmann-Busch GmbH, Salzgitter, Germany

[21] Appl. No.: 201,193

[22] Filed: Feb. 24, 1994

[30] Foreign Application Priority Data

Feb. 24, 1993 [DE] Germany .............. 43 05 614.8

[51] Int. Cl.⁶ ............................................. B61D 17/00
[52] U.S. Cl. .................... 105/3; 105/4.1; 213/75 R; 280/408
[58] Field of Search ................ 105/3, 4.1, 8.1; 213/62 R, 64, 75 R; 384/456, 490, 510, 592, 611, 617; 280/403, 408 X, 483, 488, 492

[56] References Cited

U.S. PATENT DOCUMENTS

| | | | |
|---|---|---|---|
| 2,843,417 | 7/1958 | Wahl et al. | 105/3 X |
| 3,687,084 | 8/1972 | O'Leary et al. | 105/4.1 |
| 5,332,247 | 7/1994 | Etherington | 280/408 X |

FOREIGN PATENT DOCUMENTS

| | | | |
|---|---|---|---|
| 2348092 | 11/1977 | France . | |
| 2562859 | 10/1985 | France | 105/4.1 |
| 1013527 | 8/1987 | Germany . | |
| 3902924A1 | 8/1990 | Germany . | |
| 4306164 | 10/1992 | Japan | 213/75 R |
| 1039772 | 9/1983 | U.S.S.R. | 105/3 |
| WO-A89/09715 | 10/1989 | WIPO . | |

Primary Examiner—Robert J. Oberleitner
Assistant Examiner—S. Joseph Morano
Attorney, Agent, or Firm—McGlew and Tuttle

[57] ABSTRACT

The present invention pertains to a hinge connection for connecting vehicle parts 1 and 2 of a multiple-unit rail-borne vehicle in an articulated manner by a rolling bearing 3, which is held on a support 2a projecting beyond the end of one of the vehicle parts 2. The hinge cooperates with a support 1a projecting beyond the end of another vehicle part 1 in an articulated manner, and permits horizontal and vertical deflecting movements of the vehicle parts 1 and 2 in relation to one another. The design of the hinge connection is such that the rolling bearing is relieved of wear-promoting loads and greater horizontal buckling angles between the connected vehicle parts can be obtained. This objective is accomplished by the support 2a of the second vehicle part 2 being fixed, via an elastomer hinge 4, to the inner ring 3a of the rolling bearing 3, which has neither radial nor axial play, at least in the installed state.

14 Claims, 2 Drawing Sheets

HINGE CONNECTION FOR CONNECTING VEHICLE PARTS OF A MULTIPLE-UNIT RAIL-BORNE VEHICLE IN AN ARTICULATED MANNER

FIELD OF THE INVENTION

The present invention pertains to a hinge connection or coupler for connecting vehicle parts of a multiple-unit rail-borne vehicle in an articulated manner, and in particular to a connection having a rolling bearing and an elastomer hinge for absorbing horizontal, vertical and pivotal movements between first and second rail borne vehicles which are connected.

BACKGROUND OF THE INVENTION

Such a hinge connection has been known from DE 39,02,924. A step bearing of a first vehicle part extends from the top into the free space of a closed roller ring and is fixed at the inner ring of the roller ring. The outer ring of the roller ring is mounted pivotably around the transverse axis of the vehicle in two oppositely arranged bearings, which are arranged at the end of two connecting arms and enclose the roller ring in a fork-like manner. Low vehicle floor levels can be obtained due to this integration of the support in the free space of the roller ring, and a sufficient distance can also be maintained between the underside of the sealing bellows and the level of the rail.

The above-described hinge connection uses a relatively large rolling bearing as the roller ring, and the roller bodies are subject—in the open and closed designs alike—to considerable wear, especially when higher torques must be absorbed, due to the unavoidable deformations of the guide paths. Shocks and structure-borne sound can be transmitted to the rolling bearing without damping.

Furthermore, the greatest possible horizontal buckling angle between the vehicle parts is limited more extensively by the broad base of the connecting arms projecting beyond the vehicle parts than in the case of a smaller base.

SUMMARY AND OBJECTS OF THE INVENTION

The basic task of the present invention is to improve a hinge connection of the class described in the introduction such that the rolling bearing is relieved of wear-promoting loads, and greater horizontal buckling angles between the connected vehicle parts can be achieved.

The present invention connects first and second rail borne vehicles through elements known as supports, extending from the end of the vehicles. The first vehicle has a first support extending from an end and the second vehicle has a second support extending from an end. The first and second supports are facing each other and the first support includes a rolling bearing with an outer ring fixed to the first support. The rolling bearing also includes an inner ring rotatable with respect to the outer ring. The bearing is designed so that there is no substantial play or movement of the inner ring with respect to the outer ring, in radial or axial directions of the rolling bearing. Any play or movement between the two vehicles will be absorbed or compensated by an elastomer hinge of the connection or coupler.

The elastomer hinge connects the inner ring of the rolling bearing to the second support. The elastomer hinge has an elastomer means for absorbing horizontal, vertical and pivotable movements between the first and second vehicles. The elastomer hinge includes an outer body which is connected to the inner ring of the rolling bearing. The elastomer hinge also includes an inner body which is connected to the second support. The outer body and inner body are positioned substantially inside a free space defined by the inner ring. This allows the elastomer hinge to be positioned at roughly the same height as the rolling bearing. In this way, the entire connection or coupler is very, compact and does not interfere with the other operations of the vehicles.

The outer body is formed of a rigid material, preferably metal, and has an inner surface which defines a cavity. The inner body is positioned inside this cavity. The inner surface of the outer body is cupped and has a radius which increases from a first axial end of the elastomer hinge to a second axial end of the elastomer hinge. The inner body has an outer surface which faces the inner surface of the outer body. The outer surface of the inner body is also curved and also has a radius which increases from the first axial end of the elastomer hinge to the second axial end of the elastomer hinge. Both surfaces increase in radius in correspondence with each other. The curves of the surfaces are such that the inner body may pivot away from an axial axis with respect to the outer body.

The elastomer means is positioned between the inner and outer bodies of the elastomer hinge. The elastomer means includes an elastomer layer which is connected to the inner and outer surfaces and which connects the inner and outer bodies together, even during limited horizontal, vertical and pivotal movements of the inner body with respect to the outer body.

The inner body defines a centering hole. A centering pin is connected to the second support and is insertable into the centering hole. The centering hole has a centering surface on one axial end for guiding the centering pin into the centering hole.

The elastomer means has a spring rigidity which is substantially constant during deflections of the rigid inner and outer body with respect to each other. This is especially true with regard to angular deflections away from the axial direction of the rolling bearing and within the limits of those deflections caused by transit movements of the first vehicle with respect to the second vehicle.

The rails upon which the vehicles roll, will have irregularities. These irregularities cause transit movements between the vehicles. The magnitude of these irregularities is ideally kept below a limit so that the magnitude of the transit movements are below a limit and therefore the deflections of the inner body with the outer body are below a limit. The elastomer layer is chosen so that the spring constant is substantially constant below this limit of deflections caused by transit movements.

The rolling bearing is preferably a four point bearing with a split inner ring. The inner ring has a first axial side which is in contact with a contact surface of the outer body and a first tension ring is positioned on a second axial side of the inner ring. Tightening screws draw the contact surface of the inner body towards the first tensioning ring and effectively clamp the inner ring to the inner body. The first support has a surface which is positioned adjacent the first axial side of the outer ring and a second tensioning ring is positioned against a second axial side of the outer ring. Tightening screws then draw the second tensioning ring towards the first support, and clamp or fix the outer ring to the first support.

The centering pin extends into the first axial end of the centering hole. A centering ring is positioned at a second axial end of the centering hole. The centering ring is larger than the centering hole and a fastening means fastens the centering means to the centering pin, thereby fastening the centering pin to the inner body. The fastening means is preferably a bolt extending in a fastening passage of the centering pin. The bolt fastens the centering ring to either the centering pin or to the second support.

In this way, the rolling bearing permits rotation between the first and second vehicles and the elastomer hinge absorbs or allows other movements between the vehicles without excessive force and wear on the rolling bearing. The coupler of the present invention is very compact due to the position of the elastomer hinge inside the rolling bearing and the centering hole and centering pin allow for easy connection and disconnection of the two vehicles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
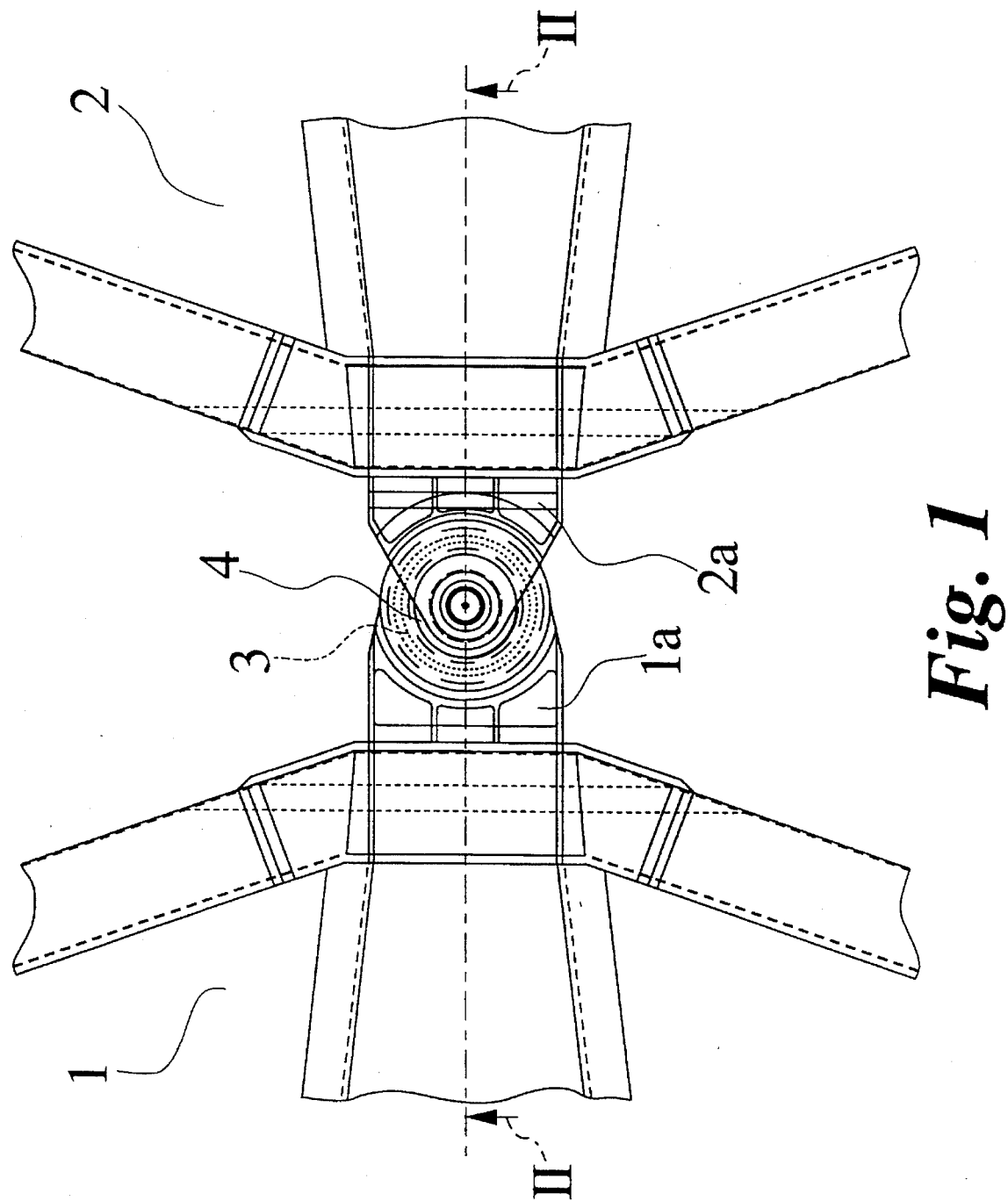
FIG. 1 is the top view of the hinge area of a rail-borne vehicle with a hinge connection according to the present invention.

The hinge connection according to the present invention is arranged between two vehicle parts 1 and 2 and has a rolling bearing 3, which is held on a support 1a projecting beyond the end of a the first vehicle part 1, cooperates with a support 2a projecting beyond the end of a the second vehicle part 2 in an articulated manner, and permits horizontal and vertical deflecting movements of the vehicle parts 1 and 2 in relation to one another.

The support 2a of the second vehicle part 2 is fixed to the inner ring 3a of the rolling bearing 3 via an elastomer hinge 4. The elastomer hinge 4 is arranged in the space enclosed by the inner ring 3a at least essentially at the height level of a vertical extension of the rolling bearing 3.

The elastomer hinge 4 has a rigid inner body 4a of sufficient strength with a vertical centering hole 4d and with a centering surface 4e for a centering pin 7 fastened to the support 2a. Furthermore, the elastomer hinge 4 has a rigid outer body 4b with a contact surface 4f for the inner ring 3a of the rolling bearing 3 and an elastomer layer 4c arranged between the inner body 4a and the outer body 4b.

The outer radius of the inner body 4a is designed as a radius decreasing or increasing in the vertical extension according to a predetermined mathematical function, and the inner radius of the outer body 4b is designed as a radius decreasing or increasing at the same ratio in the vertical extension or direction. In the exemplary embodiment represented in FIGS. 1 and 2, the elastomer hinge is arranged such that the outer radius of the inner body 4a decreases downward according to a defined mathematical function, and the inner radius of the outer body 4b decreases to the same extent. In principle, the elastomer hinge may also be in a position that is rotated by 180° from this position.

For certain jacket surfaces, which correspond at least approximately to the surface of a hemisphere, the elastomer hinges 4 of such a design are called hemispherical bearings. Such a bearing is shown in FIG. 2.

The spring rigidity of the elastomer hinge 4 is designed to be approximately constant for small deflections of the inner and outer bodies 4a and 4b from the vertical direction in relation to one another in the longitudinal and transverse directions. The deflections from the vertical direction, which are to be absorbed during operation, are approximately 2°–4°.

The rolling bearing 3 is designed as a commercially available four-point bearing with a split inner ring 3a and with a small diameter compared with commercially available roller rings. The roller rings used in hinge connections have external diameters of ca. 0.5 m and greater. The rolling bearing 3 needed in the present invention may be considerably smaller (external diameter ca. 0.3 m). The inner ring 3a of the rolling bearing 3 is fixed on the contact surface 4f of the outer body 4b of the elastomer hinge 4 by means of a tension ring 5 and tightening screws 5a. The outer ring 3b of the rolling bearing 3 is fastened to the support 1a of the vehicle part 1 by means of a second tension ring 6 and tightening screws 6a. The rolling bearing is thus tensioned radially and axially and has neither radial nor axial play, at least in the installed state.

Figure 2:
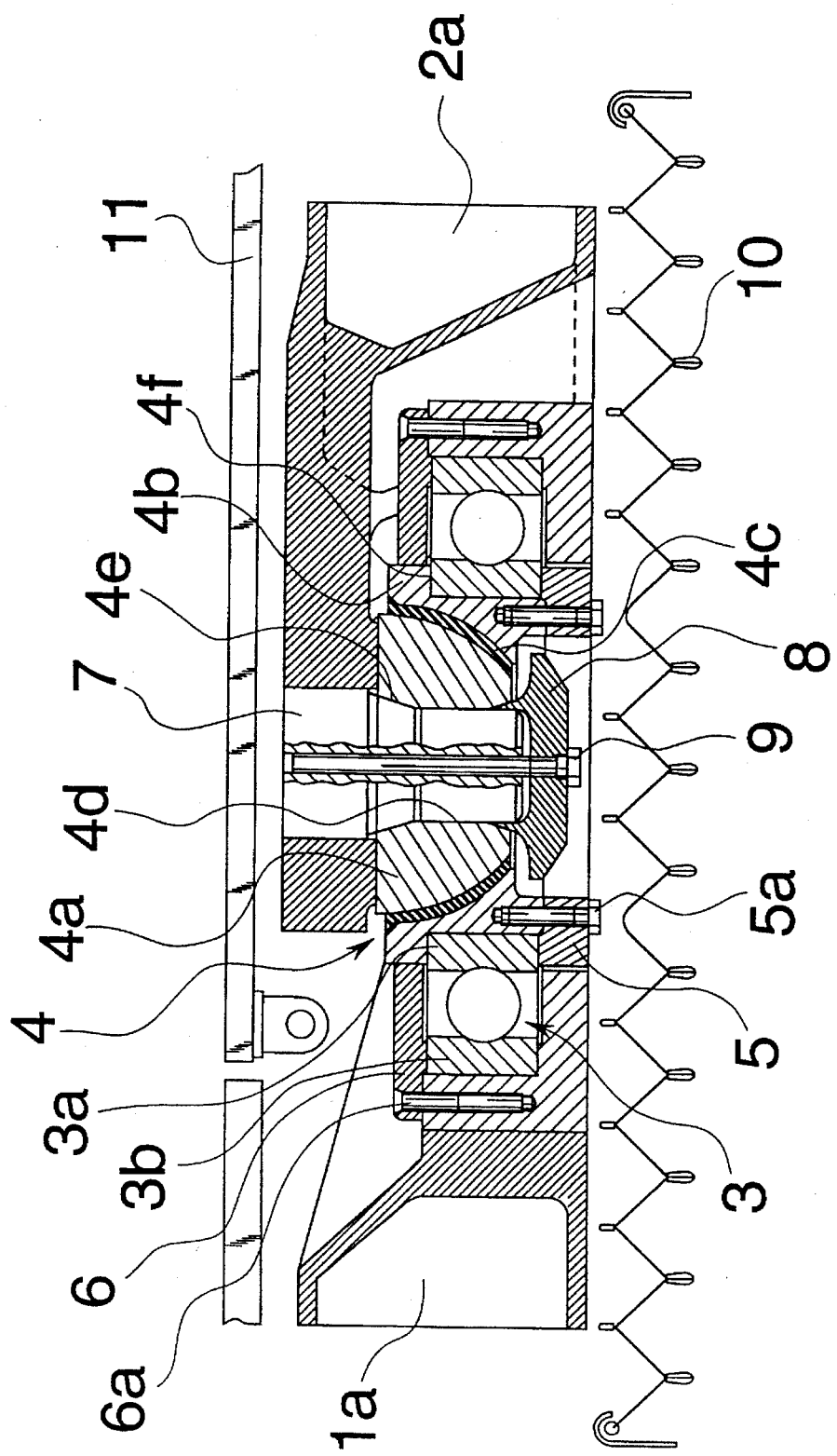
FIG. 2 is the section along line II—II in FIG. 1.

The centering pin 7, which extends into the centering hole 4d from one side, the top as shown in FIG. 2, is fastened to the support 2a. The centering pin 7 is fastened to the inner body 4a of the elastomer hinge 4 by means of a centering ring 8 and a detachable fastening means 9 such as a reduced-shaft bolt 9 on the opposite side.

The support 2a of the vehicle part 2 extends with the associated centering pin 7 into the centering hole 4d frown the top and is thus supported on the inner body 4a of the elastomer hinge 4. Particularly favorable installation and removal are ensured when the vehicle part 2 is an end car part, because simple supporting and raising is possible in this case. The hinge area is protected by a circumferential hinge bellows 10, which is arranged between the vehicle parts 1 and 2. Due to the flat design of the hinge connection, an especially low floor height for the floor 11 is possible, along with a sufficient distance between the underside of the hinge bellows 10 and the rail level.

While specific embodiments of the invention have been shown and described in detail to illustrate the application of the principles of the invention, it win be understood that the invention may be embodied otherwise without departing from such principles.

What is claimed is:

1. A device for rotatably connecting first and second rail-borne vehicles, the device comprising:

a first support connectable to the first rail borne vehicle;

a rolling bearing having an outer ring attached to said first support, said rolling bearing also having an inner ring rotatably connected to said outer ring, said inner ring being substantially fixed in axial and radial directions of said rolling bearing with respect to said outer ring;

a second support connectable to the second rail borne vehicle;

an elastomer hinge having a first part connected to said inner ring of said rolling bearing and said elastomer hinge having a second part connected to said second support, said elastomer hinge including elastomer means for movably connecting said first and second parts of said elastomer hinge together subject to vertical and horizontal movements of said first part with respect to said second part, said elastomer hinge including a rigid outer body connected to said inner ring of said rolling bearing, a centering pin connected to said second support, a rigid inner body defining a centering hole for receiving said centering pin, said elastomer means includes an elastomer layer connected to and between said rigid inner body and said rigid outer body.

2. A device in accordance with claim 1, wherein:

said elastomer hinge is positioned inside a space defined by said inner ring of said rolling bearing and substantially at a height level of said rolling bearing.

3. A device in accordance with claim 1, wherein:

an outer surface of said rigid inner body is curved and a radius of said outer surface of said rigid inner body increases from a first axial end of said elastomer hinge to a second axial end of said elastomer hinge;

an inner surface of said rigid outer body is curved and a radius of said inner surface of said rigid outer body increases from said first axial end of said elastomer hinge to said second axial end of said elastomer hinge substantially in correspondence with said outer surface of said rigid inner body.

4. A device in accordance with claim 3, wherein:

said curved outer surface of said rigid inner body and said curved inner surface of said outer body have a shape for angular deflections of said rigid inner body with respect to said rigid outer body.

5. A device in accordance with claim 1, wherein:

said elastomer means of said elastomer hinge has a spring rigidity substantially constant during deflections of said rigid inner and outer body with respect to each other and away from said axial direction of said rolling bearing.

6. A device in accordance with claim 5, wherein:

said deflections are caused by transit movements of the first rail borne vehicle with respect to the second rail borne vehicle.

7. A device in accordance with claim 1, wherein:

said rolling bearing is a four point bearing with a split said inner ring.

8. A device in accordance with claim 1, wherein:

said rigid outer body of said elastomer hinge is connected to said inner ring of said rolling bearing by means of a first tension ring and a first plurality of tightening screws;

said outer ring of said rolling bearing is connected to said first support by means of a second tension ring and a second plurality of tightening screws.

9. A device in accordance with claim 8, wherein:

said rigid outer body has a contact surface in contact with a first axial side of said inner ring, said first tension ring is positioned against a second axial side of said inner ring and said first plurality of tightening screws draws said contact surface of said rigid outer body toward said first tension ring;

said first support has a contact surface in contact with a first axial side of said outer ring, said second tension ring is positioned against a second axial side of said outer ring and said second plurality of tightening screws draws said contact surface of said first support toward said second tension ring.

10. A device in accordance with claim 1, wherein:

said elastomer hinge includes a centering ring and a fastening means for fastening said centering ring to said centering pin and for fastening said rigid inner body to said centering pin by means of said centering ring.

11. A device in accordance with claim 10, wherein:

said centering pin extends into said centering hole from a first axial end of said centering hole, said centering ring being attached to said centering pin at a second axial end of said centering hole, said centering ring having a dimension larger than said centering hole, said centering pin defining an axially extending fastening passage, said fastening means including a reduced shaft bolt extending through said fastening passage and fastening said centering ring to said second support.

12. A device in accordance with claim 1, wherein:

said centering pin downwardly extends into said centering hole of said rigid inner body, and said rigid inner body supports said centering pin and said second support.

13. A device in accordance with claim 1, wherein:

said second support is connectable an end car part.

14. A device in accordance with claim 1, wherein:

said rigid inner body also defines a centering surface at an axial end of said centering hole.

* * * * *